United States Patent
Wang

(10) Patent No.: US 11,741,708 B2
(45) Date of Patent: *Aug. 29, 2023

(54) IMAGE RECOGNITION METHOD AND SYSTEM BASED ON DEEP LEARNING

(71) Applicant: PIXART IMAGING INC., Hsin-Chu (TW)

(72) Inventor: Guo-Zhen Wang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,551

(22) Filed: Jan. 19, 2022

(65) Prior Publication Data

US 2022/0139064 A1    May 5, 2022

Related U.S. Application Data

(63) Continuation of application No. 16/898,586, filed on Jun. 11, 2020, now Pat. No. 11,270,149, which is a (Continued)

(30) Foreign Application Priority Data

Aug. 26, 2016 (TW) ................................. 105127446
Nov. 14, 2016 (TW) ................................. 105137097

(51) Int. Cl.
| | |
|---|---|
| *G06V 10/44* | (2022.01) |
| *G06V 20/00* | (2022.01) |
| *G06N 20/00* | (2019.01) |
| *G06F 18/2413* | (2023.01) |
| *G06F 18/243* | (2023.01) |

(Continued)

(52) U.S. Cl.
CPC ........ *G06V 20/35* (2022.01); *G06F 18/24143* (2023.01); *G06F 18/24317* (2023.01); *G06N 3/045* (2023.01); *G06N 3/08* (2013.01); *G06N 20/00* (2019.01); *G06V 10/454* (2022.01); *G06V 10/764* (2022.01); *G06V 10/82* (2022.01); *G06V 20/70* (2022.01)

(58) Field of Classification Search
CPC ............. G06K 9/00684; G06K 9/4609; G06K 9/4628; G06K 9/6274; G06K 9/6281; G06N 20/00; G06N 3/0454; G06N 3/08; G06N 3/045; H04N 17/002; G06V 20/35; G06V 10/454; G06V 10/764; G06V 10/82; G06V 20/70; G06F 18/24143; G06F 18/24317

See application file for complete search history.

(56) References Cited

U.S. PATENT DOCUMENTS

| | | | |
|---|---|---|---|
| 11,270,149 B2* | 3/2022 | Wang | ........................ G06N 3/08 |
| 2011/0221666 A1* | 9/2011 | Newton | ................ G06F 3/0304 |
| | | | 345/156 |

* cited by examiner

*Primary Examiner* — Mekonen T Bekele
(74) *Attorney, Agent, or Firm* — Li & Cai Intellectual Property (USA) Office

(57) ABSTRACT

An image recognition method and system based on deep learning are provided. The image recognition system includes a first recognizing engine, at least one second recognizing engine and a processing circuit. The second recognizing engine is activated to recognize a testing image when the first recognizing engine is recognizing the testing image. The processing circuit determines whether to interrupt the first recognizing engine recognizing the testing image according to a result outputted by the second recognizing engine after the second recognizing engine completes recognition of the testing image.

4 Claims, 7 Drawing Sheets

Related U.S. Application Data continuation of application No. 15/670,511, filed on Aug. 7, 2017, now Pat. No. 10,726,291.

(51) Int. Cl.
*G06N 3/045* (2023.01)
*G06V 10/764* (2022.01)
*G06V 10/82* (2022.01)
*G06V 20/70* (2022.01)
*G06N 3/08* (2023.01)

IMAGE RECOGNITION METHOD AND SYSTEM BASED ON DEEP LEARNING

CROSS-REFERENCE TO RELATED PATENT APPLICATION

This is a continuation application of U.S. application Ser. No. 16/898,586, filed on Jun. 11, 2020 and entitled "IMAGE RECOGNITION METHOD AND SYSTEM BASED ON DEEP LEARNING", which is a continuation application of U.S. application Ser. No. 15/670,511, filed on Aug. 7, 2017 and entitled "IMAGE RECOGNITION METHOD AND SYSTEM BASED ON DEEP LEARNING", and the entire contents of which are incorporated herein by reference.

FIELD OF THE DISCLOSURE

The present disclosure relates to an image recognition method and system, and more particularly to an image recognition method and system based on deep learning.

BACKGROUND OF THE DISCLOSURE

Deep learning is a division of machine learning, and originates from researches on artificial neural network. Basically, deep learning is a high-level abstract algorithm employing multilayer processing, which includes complex hierarchy or multiple nonlinear transformations. Therefore, deep learning is widely used in machine vision, speech recognition, natural language processing, audio recognition and bioinformatics.

Among the developed deep learning algorithms, deep convolutional neural network (CNN) is the one most used for image recognition. However, current models of deep convolutional neural network algorithm are mostly built and trained with high resolution images. In practice, however, the testing images are frequently in low resolution due to environmental or image sensor issues, thus affecting the accuracy of image recognition. Therefore, a technical solution to improve the aforementioned limitation is necessary.

SUMMARY OF THE DISCLOSURE

The object of the present disclosure is to provide an image recognition method based on deep learning, which includes the following steps: capturing a testing image by an image sensor; categorizing the testing image into a high resolution mode or a low resolution mode by a categorizing engine according to at least one parameter used by the image sensor when capturing the testing image; recognizing the testing image by a first recognizing engine when the testing image is categorized to the high resolution mode, and recognizing the testing image by a second recognizing engine when the testing image is categorized to the low resolution mode. In particular, the first recognizing engine and the second recognizing engine employ non-identical learning algorithms.

Preferably, the at least one parameter used by the image sensor when capturing the testing image includes a gain value or an exposure time, and the categorizing engine is a context-aware engine.

In order to achieve the aforementioned objects, according to an embodiment of the present disclosure, an image recognition system based on deep learning includes an image sensor, a categorizing engine, a first recognizing engine and a second recognizing engine. The image sensor captures a testing image. The categorizing engine categorizes the testing image into a high resolution mode or a low resolution mode according to at least one parameter used by the image sensor when capturing the testing image. The first recognizing engine recognizes the testing image when the testing image is categorized to the high resolution mode. The second recognizing engine recognizes the testing image when the testing image is categorized to the low resolution mode. In particular, the first recognizing engine and the second recognizing engine employ non-identical learning algorithms.

Preferably, the at least one parameter used by the image sensor when capturing the testing image includes a gain value or an exposure time, and the categorizing engine is a context-aware engine.

In the present disclosure, the image recognition method and system based on deep learning categorizes the testing image into the high resolution mode or the low resolution mode, and then the testing image is recognized by the appropriate recognizing engine. Therefore, the present disclosure effectively increases the accuracy of image recognition under various conditions.

In order to further the understanding regarding the present disclosure, the following embodiments are provided along with illustrations to facilitate the understanding of the present disclosure.

DETAILED DESCRIPTION OF THE EXEMPLARY EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
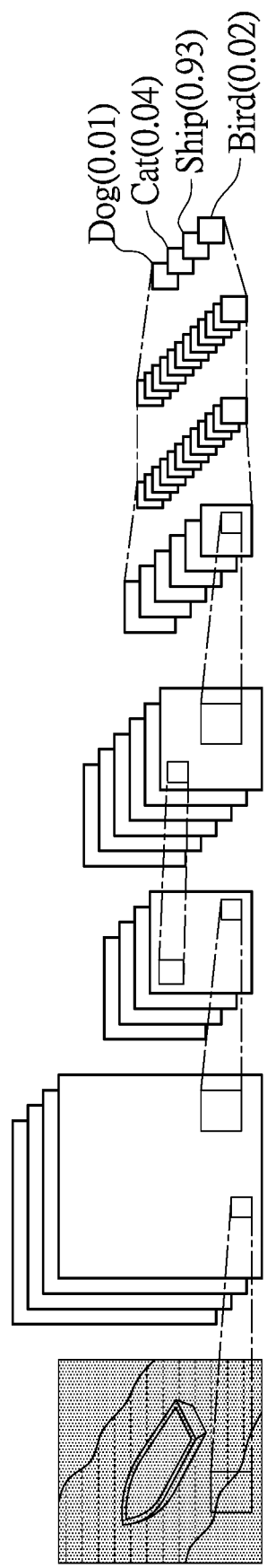
FIG. 1 shows a schematic diagram of an image recognition method based on deep convolutional neural network algorithm according to an embodiment of the present disclosure.

FIG. 1 shows a schematic diagram of an image recognition method based on deep convolutional neural network algorithm according to an embodiment of the present disclosure. It should be noted that the following descriptions are based on the present embodiment shown in FIG. 1, but the present disclosure is not limited thereto. A person having ordinary skill in the art may modify the architecture of deep learning to fit particular needs. In addition, details of the deep convolutional neural network algorithm are not addressed herein as it should have been known to a person having ordinary skill in the art.

A recognizing engine employing deep convolutional neural network algorithm and trained with high resolution sample images cannot accurately recognize a testing image with low resolution because the modeling and feature groups are built on high resolution images. Similarly, a recognizing engine trained with low resolution sample images cannot accurately recognize a testing image with high resolution because the modeling and feature groups are built on low resolution images.

In addition, training a recognizing engine, which employs deep convolutional neural network algorithm, with both high and low resolution images could lead to a massive, overcomplicated model. The modeling process would not converge easily and may fail to generate the feature groups. Therefore, a person having ordinary skill in the art could understand that the image recognition method in the present disclosure resolves the aforementioned limitation by separately training a first recognizing engine with a first sample image group having high resolution and training a second recognizing engine with a second sample image group having low resolution separately. A first feature group is generated for high resolution images, and a second feature group is generated for low resolution images.

Figure 2:
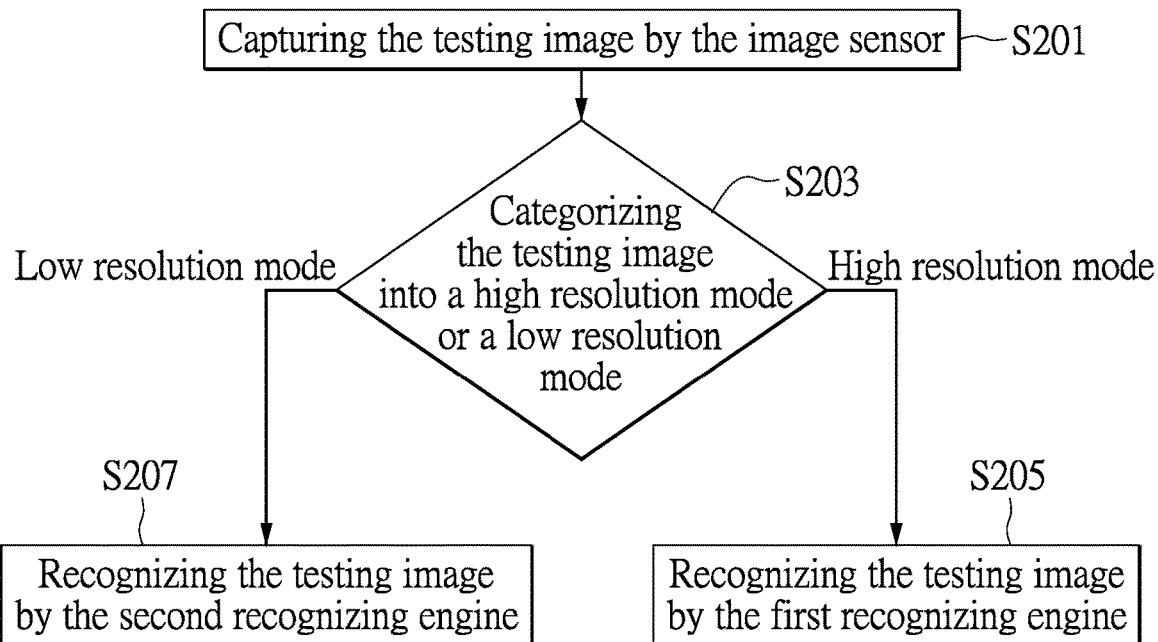
FIG. 2 shows a schematic flowchart of an image recognition method based on deep learning according to an embodiment of the present disclosure.

FIG. 2 shows a schematic flowchart of an image recognition method based on deep learning according to the present embodiment. Step S203 is categorizing the testing image as a high resolution mode or a low resolution mode by a categorizing engine according to at least one parameter used by an image sensor when capturing the testing image. Then, according to the result of categorization, taking step S205, which is recognizing the testing image by a first recognizing engine when the testing image is categorized to the high resolution mode, or taking step S207, which is recognizing the testing image by a second recognizing engine when the testing image is categorized to the low resolution mode. The first recognizing engine and the second recognizing engine employ non-identical learning algorithms.

It should be noted that step S205 and S207 are in parallel and not mutually exclusive. In addition, the first recognizing engine is provided with the first feature group when recognizing the testing image. Similarly, the second recognizing engine is provided with the second feature group when recognizing the testing image. The details of employing a feature group by a recognizing engine when recognizing a testing image should be known to a person having ordinary skill in the art, and therefore is not described herein.

The image sensor could be a camera or a scanner for capturing a testing image. The first recognizing engine could employ a deep convolutional neural network algorithm, and the second recognizing engine could employ a boosting algorithm. However, the present disclosure does not intend to limit the type of image sensor and the algorithm employed by the first and second recognizing engines.

Therefore, the core concept of the image recognition method in the present disclosure is to separately train a recognizing engine for high resolution images and a recognizing engine for low resolution images. The two recognizing engines generate two independent feature groups (i.e., two independent models) specifically for high resolution and low resolution images respectively. A categorizing engine categorizes a testing image into the high resolution mode or the low resolution mode, and then the testing image is recognized by the appropriate recognizing engine. Therefore, the present disclosure increases the accuracy of image recognition under various environmental (or image resolution) conditions.

Specifically, the at least one parameter includes a gain value or an exposure time, and the categorizing engine is a context-aware engine. That is, the context-aware engine categorizes the testing image into the high resolution mode or the low resolution mode based on the gain value or the exposure time. To be more specific, when the light sensed by the image sensor is deficient, the image sensor would extend the time for light sensing, whereby by observing that the exposure time to be greater than a first threshold, the image sensor would be determined to be in a low resolution mode. When the image sensor is overexposed, the image sensor shortens the exposure time, in which when the exposure time is found to be smaller than a second threshold, overexposure would thus be determined, and the image sensor would also be determined to be in a low resolution mode. When the light sensed by the image sensor is moderate, the exposure time adjusted by the image sensor would fall within the first threshold and the second threshold, and the image sensor would therefore be determined to be in a high resolution mode. the first threshold is smaller than the second threshold Similarly, the gain value is the level of gain applied on the testing image. A high gain value not only increases the intensity of the image, but also the intensity of the noise. Therefore, the categorizing engine could categorize the testing image into the low resolution mode if the gain value of the testing image exceeds a second threshold. It should be noted that the present disclosure is not limited by the present embodiment, in which the categorizing engine categorizes the testing image based on exposure time, gain value or the combination thereof. A person having ordinary skill in the art could change the parameters used by the categorizing engine (i.e., the context-aware engine) to fit particular needs.

Figure 3:
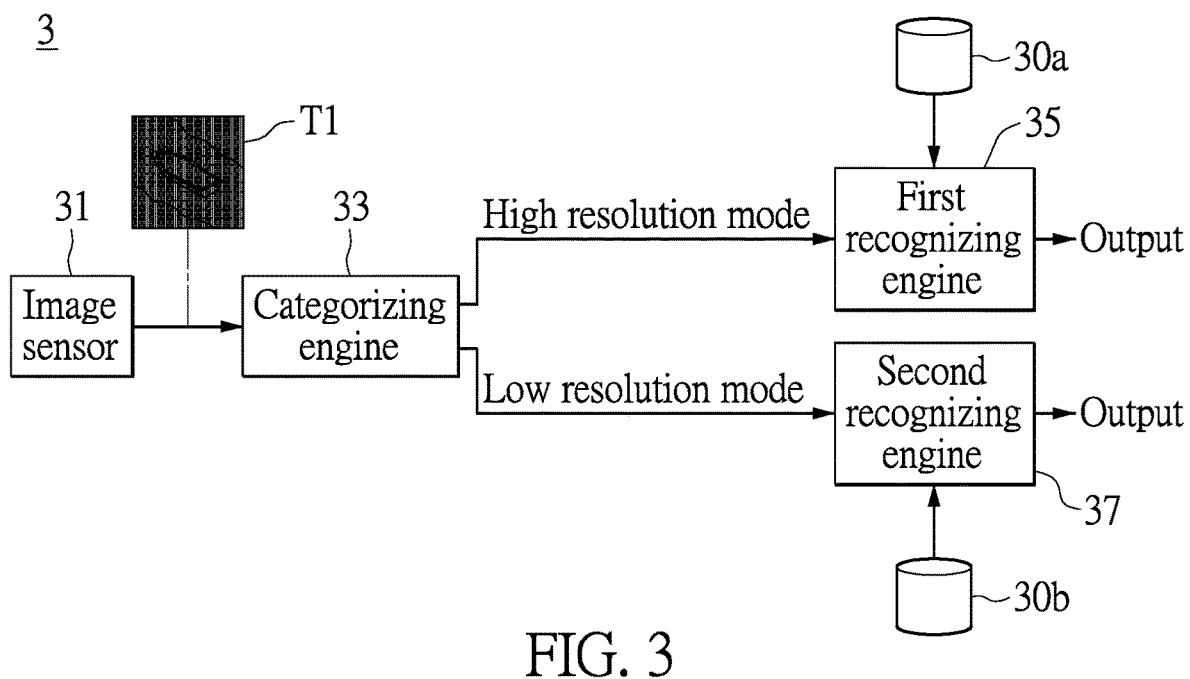
FIG. 3 shows a schematic block diagram of an image recognition system based on deep learning according to an embodiment of the present disclosure.

The present disclosure further provides an image recognition system based on the aforementioned image recognition method. FIG. 3 shows a schematic block diagram of an image recognition system based on deep learning according to an embodiment of the present disclosure. It should be noted that the present disclosure is not limited by the embodiment shown in FIG. 3.

Specifically, the image recognition system 3 includes an image sensor 31, a categorizing engine 33, a first recognizing engine 35 and a second recognizing engine 37, which are implemented in hardware or software. In addition, the image sensor 31, the categorizing engine 33, the first recognizing engine 35 and the second recognizing engine 37 could be implemented integrally or separately, the present disclosure not being limited thereto. The first recognizing engine 35 is trained with a high resolution sample image group (not shown in drawings) and generates a first feature group 30a, and the second recognizing engine 37 is trained with a low resolution sample image group (not shown in drawings) and generates a second feature group 30b.

It should be noted that the image recognition system 3 could conduct the method shown in FIG. 2. That is, the image sensor 31 captures a testing image T1, and the categorizing engine 33 categorizes the testing image T1 to the high resolution mode or the low resolution mode according to at least one parameter used by the image sensor 31 when capturing the testing image T1.

The first recognizing engine 35, which employs a deep convolutional neural network algorithm, recognizes the testing image T1 when the testing image T1 is categorized to the high resolution mode. The second recognizing engine 37, which employs a boosting algorithm, recognizes the testing image T1 when the testing image T1 is categorized to the low resolution mode. It should be noted that the algorithm employed by the first recognizing engine 35 is not limited to the deep convolutional neural network and the algorithm employed by the second recognizing engine 37 is not limited to the boosting algorithm in the present disclosure.

As described previously, the at least one parameter used by the image sensor 31 when capturing the testing image T1 includes a gain value or an exposure time, and the categorizing engine is a context-aware engine. A person having ordinary skill in the art should understand that the core concept of the image recognition system in the present disclosure is to train a recognizing engine for high resolution images and a recognizing engine for low resolution image separately. The two recognizing engines generate two independent feature groups (i.e., two independent models) specifically for high resolution and low resolution images respectively. The categorizing engine categorizes a testing image into the high resolution mode or the low resolution mode, and then the testing image is recognized by the appropriate recognizing engine. Therefore, the present disclosure increases the accuracy of image recognition under various environmental (image resolution) conditions.

On the other hand, if the first recognizing engine 35 employs the deep convolutional neural network algorithm shown in FIG. 1, a person having ordinary skill in the art should understand that the number of the first feature group 30a increases as the layer of convolution increases when training the first recognizing engine with the first sample image group. Therefore, the image recognition system 3 should include a memory that could store a great number of the first feature group 30a in order to be successfully implemented in hardware. The present disclosure provides a solution to address the above issue.

Figure 4:
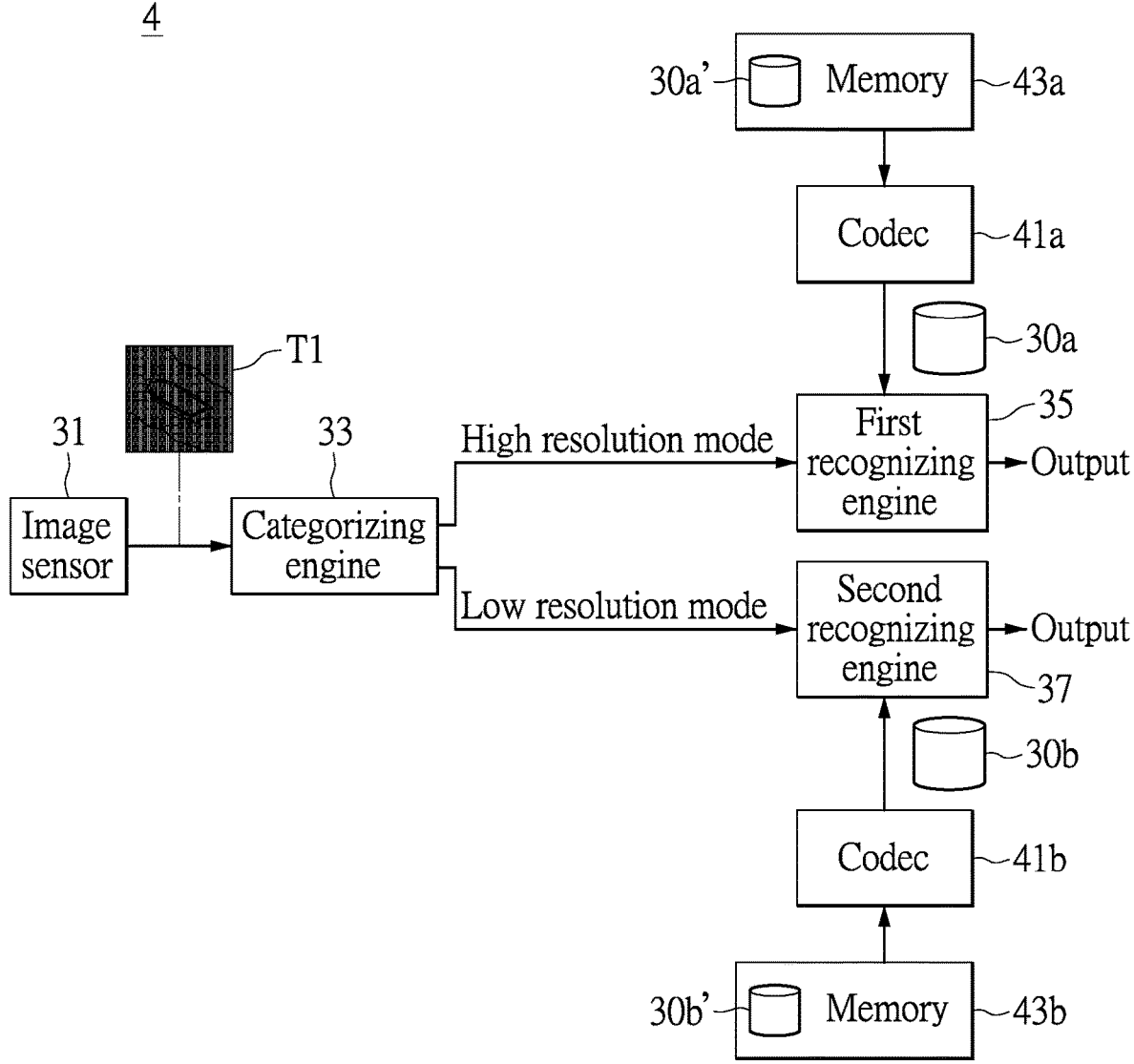
FIG. 4 shows a schematic block diagram of an image recognition system based on deep learning according to another embodiment of the present disclosure.

FIG. 4 shows a schematic block diagram of an image recognition system based on deep learning according to another embodiment of the present disclosure. In contrast to FIG. 3, the image recognition system 4 in FIG. 4 includes not only the image sensor 31, categorizing engine 33, the first recognizing engine 35 and the second recognizing engine 37, but also at least one codec 41. It should be noted that the following embodiment includes a codec 41a and a codec 41b to facilitate the understanding of the image recognition system 4, but the number of codec in the present disclosure is not limited thereto. That is, the codec 41a and codec 41b could be the same codec 41 or two different codecs, but the present disclosure is not limited thereto. In addition, the codec 41a and codec 41b could be implemented in hardware or software, but the present disclosure is not limited thereto.

Specifically, the codec 41a encodes the feature group 30a, and the codec 41b encodes the feature group 30b. The encoded first feature group 30a' and the encoded second feature group 30b' are stored in a memory 43 of the image recognition system 4. It should be noted that the present embodiment includes a memory 43a and a memory 43b to facilitate the understanding of the image recognition system 4, but the number of memory in the present disclosure is not limited thereto. That is, the memory 43a and memory 43b could be the same memory 43 or two different memories, but the present disclosure is not limited thereto. In addition, the memory 43a and memory 43b could be a flash memory, but the present disclosure is not limited thereto.

Referring to FIG. 4, for example, the codec 41a encodes the first feature group 30a, and the encoded first feature group 30a' is stored in the memory 43a. Similarly, the codec 41b encodes the second feature group 30b, and the encoded second feature group 30b' is stored in the memory 43b. It should be noted that the present disclosure does not intend to limit the encoding method used by the codec 41a and codec 41b when encoding the first feature group 30a and second feature group 30b. A person having ordinary skill in the art may employ different codecs to fit particular needs. In this regard, the image recognition system 4 in the present embodiment could effectively resolve the conventional need for storage of a great number of feature groups, and reduce the cost of hardware of the image recognition system 4.

Referring to FIG. 3 again, when the testing image T1 is categorized to the high resolution mode, the first feature group 30a is provided to the first recognizing engine 35 for recognizing the testing image T1. Applying the same process in the image recognition system shown in FIG. 4, when the testing image T1 is categorized to the high resolution mode, the image recognition system 4 decodes the encoded first feature group 30a' stored in the memory 43a by the codec 41a, and the first feature group 30a is provided to the first recognizing engine 35 for recognizing the testing image T1.

Similarly, when the testing image T1 is categorized to the low resolution mode, the image recognition system 4 decodes the encoded second feature group 30b' stored in the memory 43b by the codec 41b, and the second feature group 30b is provided to the first recognizing engine 37 for recognizing the testing image T1. As described previously, the details of employing a feature group by a recognizing engine when recognizing a testing image should be known to a person having ordinary skill in the art, and is not describe herein.

Figure 5:
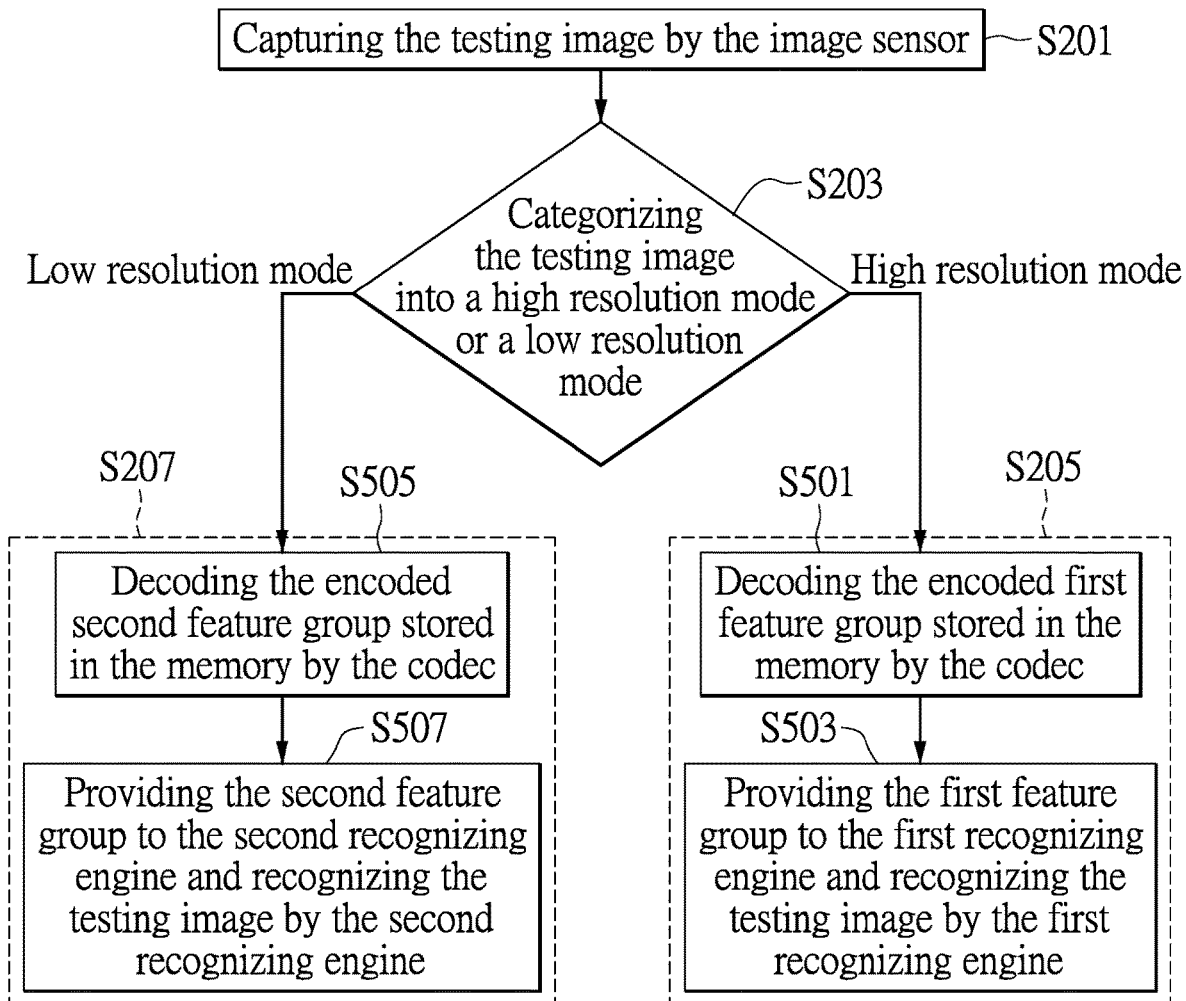
FIG. 5 shows a schematic flowchart of an image recognition method based on deep learning according to an embodiment of the present disclosure.

FIG. 5 shows a schematic flowchart of an image recognition method using the image recognition system 4 shown in FIG. 4, and the details of the image recognition system 4 are not reiterated herein. Some of the steps in FIG. 5 are identical to and use the same symbols as those in FIG. 2, and therefore are not reiterated herein.

Referring to FIG. 5, step S205 and step S207 further include steps S501-S503 and steps S505-507, respectively. Step S501 is decoding the encoded first feature group stored in the memory by the codec when the testing image is categorized to the high resolution mode. Step S503 is providing the first feature group to the first recognizing engine for recognizing the testing image. Step S505, on the other hand, is decoding the encoded second feature group stored in the memory by the codec when the testing image is categorized to the low resolution mode. Step S507 is providing the second feature group to the first recognizing engine for recognizing the testing image.

Therefore, the core concept of the method and system of image recognition based on deep learning in the present disclosure is to train a recognizing engine for high resolution images and a recognizing engine for low resolution images separately. The two recognizing engines generate two independent feature groups specifically for high resolution and low resolution images respectively. The context-aware engine (i.e., the categorizing engine 33) categorizes a testing image into the high resolution mode or the low resolution mode, and then the testing image is recognized by the appropriate recognizing engine. Therefore, the present disclosure increases the accuracy of image recognition under various conditions. In addition, the present disclosure further includes a codec to encode the feature groups generated by the recognizing engines after training so that the memory does not have to store a great number of feature groups. Therefore, the present disclosure reduces cost of hardware of the image recognition system.

Figure 6:
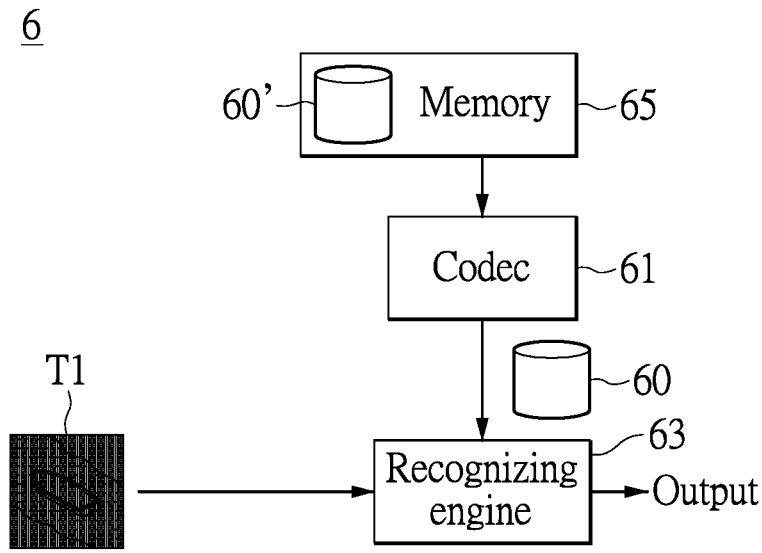
FIG. 6 shows a schematic block diagram of an image recognition system based on deep learning according to another embodiment of the present disclosure.

The following embodiment is another example showing how the present disclosure reduces the cost of hardware of the image recognition system by including a codec. FIG. 6 shows a schematic block diagram of an image recognition system based on deep learning according to another embodiment of the present disclosure. In contrast to FIG. 4, the image recognition system 6 in FIG. 6 includes at least one codec 61 and a recognizing engine 63. The recognizing engine is trained with a sample image group (not shown in drawings) and generates a feature group 60, which corresponds to the sample image group.

The codec 61 encodes the feature group 60, and the encoded feature group 60' is stored in at least one memory 65. The recognizing engine 63 recognizes a testing image T1. When recognizing the testing image T1, the image recognition system 6 decodes the encoded first feature group 60' stored in the memory 65 by the codec 61, and the first feature group 60 is provided to the recognizing engine 63 for recognizing the testing image T1. It should be noted that the recognizing engine 63 could employ a deep convolutional neural network algorithm, but the present disclosure is not limited thereto.

Figure 7:
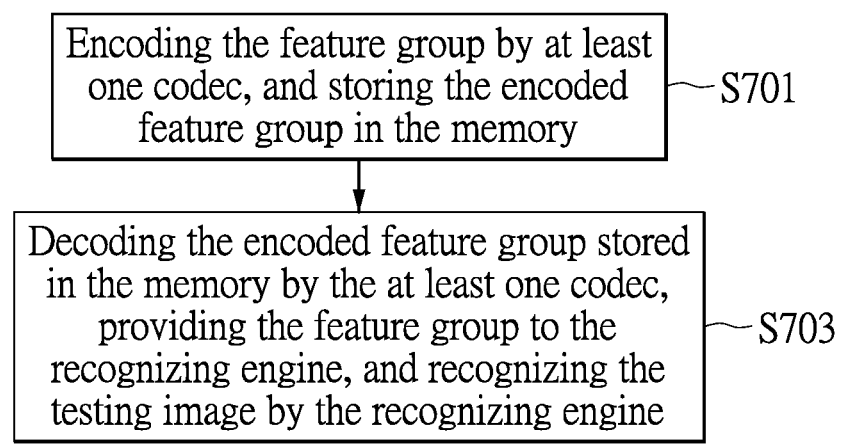
FIG. 7 shows a schematic flowchart of an image recognition method based on deep learning according to an embodiment of the present disclosure.

FIG. 7 shows a schematic flowchart of an image recognition method using the image recognition system 6 shown in FIG. 6, and the details of the image recognition system 6 are not reiterated herein.

Step S701 is encoding the feature group by at least one codec, and storing the encoded feature group in at least one memory. Step S703 is decoding the encoded feature group stored in the at least one memory by the at least one codec when recognizing a testing image, and then providing the feature group to the recognizing engine for recognizing the testing image.

When the recognizing engine 63 employs the deep convolutional neural network algorithm, as shown in FIG. 1, a person having ordinary skill in the art should understand that the time span for recognizing the testing image T1 increases as the layer of convolution increases. Therefore, the image recognition system 6 has to undergo a time-consuming and computation-intensive process to determine if the testing image T1 includes a specific element by the recognizing engine employing the deep convolutional neural network algorithm. The present disclosure provides a solution to address the above issue.

Figure 8:
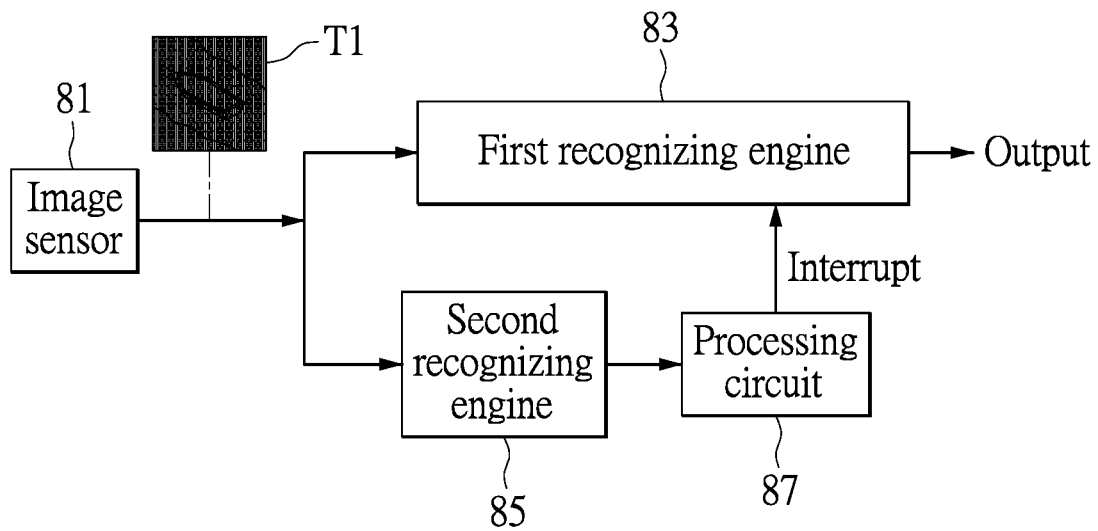
FIG. 8 shows a schematic block diagram of an image recognition system based on deep learning according to another embodiment of the present disclosure.

FIG. 8 shows a schematic block diagram of an image recognition system based on deep learning according to another embodiment of the present disclosure. Some of the elements in FIG. 8 are identical to and use the same symbols as FIGS. 3, 4 and 6, and therefore are not reiterated herein. In contrast to FIG. 6, the image recognition system 8 in FIG. 8 includes an image sensor 81, a first recognizing engine 83, at least one second recognizing engine 85 and a processing circuit 87. It should be noted that the image sensor 81, the first recognizing engine 83, the at least one second recognizing engine 85 and the processing circuit 87 could be implemented in hardware, or implemented in the combination of hardware and software. The present disclosure does not intend to limit the implementation of the elements in the image recognition system 8. In addition, the image sensor 81, the first recognizing engine 83, the at least one second recognizing engine 85 and the processing circuit 87 could be implemented integrally or separately, the present disclosure not being limited thereto.

The present embodiment includes one second recognizing engine 85 to facilitate the understanding of the image recognizing system 8, but the present disclosure is not limited thereto. Specifically, the image sensor 81 captures a testing image T1, and the testing image T1 is recognized by the first recognizing engine 83. The image sensor 81 could be a camera or a scanner, but the present disclosure is not limited thereto. In addition, the testing image T1 is also recognized by the second recognizing engine 85.

In particular, the image recognition system 8 activates the second recognizing engine 85 to recognize the testing image T1 when recognizing the testing image T1 by the first recognizing engine 83. The processing circuit 87 determines whether to interrupt the first recognizing engine 83 recognizing the testing image T1 according to a result (not shown in drawings) outputted by the second recognizing engine 85 after completing the recognition of the testing image T1.

Similar to the image recognition system 6 in FIG. 6, a person having ordinary skill in the art should understand that the image sensor 81 in FIG. 8 could be omitted. That is, the image recognition system 8 obtains the testing image T1 without the image sensor 81, and transmits the testing image T1 to the first recognizing image 83 and the second recognizing engine 85 directly. In addition, the image recognition system 8 could further include a codec (not shown in drawings) and a memory (not shown in drawings). The functions of the codec and memory have been addressed previously and are not reiterated herein.

In one exemplary configuration of the embodiment, the first recognizing engine 83 and the second recognizing engine 85 could both employ the convolutional neural network algorithm, and the convolutional layer in the first recognizing engine 83 is different from a convolutional layer in the second recognizing engine 85. That is, one feature group generated by the training process could be provided to both the first and second recognizing engines. In practice, the first recognizing engine could employ a deep convolutional neural network algorithm and the second recognizing engine could employ a shallow convolutional neural network algorithm.

In another exemplary configuration of the embodiment, the first recognizing engine 83 and the second recognizing engine 85 could employ non-identical machine learning algorithms. In practice, the first recognizing engine 83 could employ, for example, the deep convolutional neural network algorithm, and the second recognizing engine could employ, for example, an algorithm having a feature extraction circuit and a classifier. It should be noted that the present disclosure does not intend to limit the implementation of the feature extraction circuit and the classifier, a person having ordinary skill in the art could modify the design to fit particular needs.

Obviously, both exemplary configurations indicate that the second recognizing engine 85 could complete the image recognition process faster than the first recognizing engine 83. Therefore, the core concept of the present embodiment is to screen the testing image T1 by the additional second recognizing engine 85, and determine if the testing image T1 includes the specific element by the processing circuit 87 of the image recognition system 8. If the result of the screening has shown that the testing image T1 does not include the specific element, the processing circuit 87 interrupts the recognition of the testing image T1 by the first recognizing engine 83. In this regard, the image recognition system 8 prevents unnecessary computation effort and time.

Figure 9:
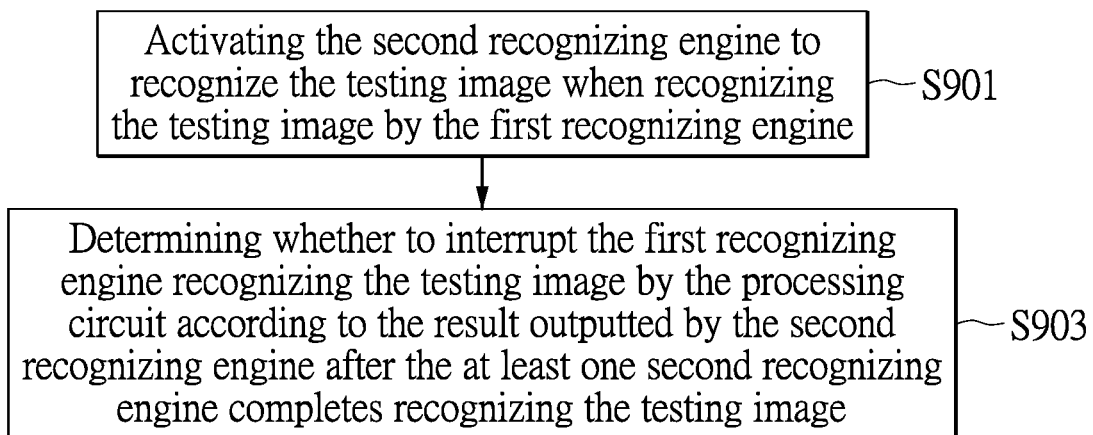
FIG. 9 shows a schematic flowchart of an image recognition method based on deep learning according to an embodiment of the present disclosure.

FIG. 9 shows a schematic flowchart of an image recognition method using the image recognition system 8 shown in FIG. 8, and the details of the image recognition system 8 are not reiterated herein.

Step S901 is activating the second recognizing engine to recognize the testing image when recognizing the testing image by the first recognizing engine. Step S903 is determining whether to interrupt the recognition of the testing image by the first recognizing engine by the processing circuit according to the result outputted by the second recognizing engine after recognition of the testing image by the second recognizing engine is completed.

Figure 10:
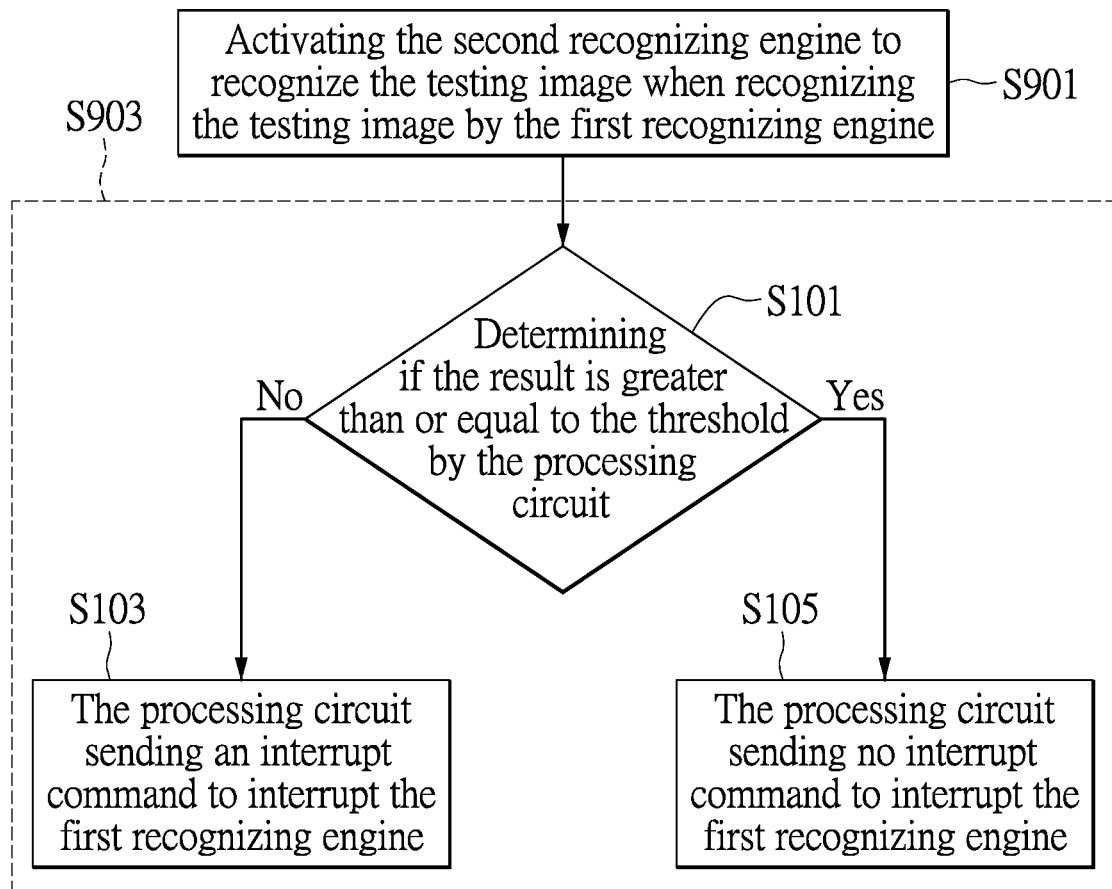
FIG. 10 shows a schematic flowchart of an image recognition method based on deep learning according to an embodiment of the present disclosure.

It should be noted that the following describes how the processing circuit determines whether to interrupt the recognition of the testing image by the first recognizing engine. FIG. 10 shows a schematic flowchart of an image recognition method based on deep learning according to an embodiment of the present disclosure. Some of the steps in FIG. 10 are identical to and use the same symbols as FIG. 9, and therefore are not reiterated herein.

As described previously, the second recognizing engine could employ, for example, a shallow convolutional neural network algorithm or an algorithm having a feature extraction circuit and a classifier. Therefore, the result outputted by the second recognizing engine indicates if the testing image includes a specific element. In practice, the result could be a probability value. In this case, a high value of probability indicates that the specific element is very likely to be included in the testing image.

In this regard, step S903 could further include steps S101-S105. Firstly, step S101 is determining if the result is greater than or equal to a threshold. Next, in step S103, the processing circuit sends an interrupt command to interrupt the first recognizing engine from recognizing the testing image if the result is less than the threshold. Otherwise, in step S105, the processing circuit sends no interrupt command to interrupt the first recognizing engine from recognizing the testing image if the result is greater than or equal to the threshold.

In other words, the processing circuit interrupts the recognition of the testing image by the first recognizing engine when the result is less than the threshold, which suggests that the probability of the specific element being included in the testing image is low. This step prevents unnecessary computation effort and time. On the other hand, the processing circuit does not interrupt the recognition of the testing image by the first recognizing engine when the result is greater than or equal to the threshold, which suggests that the probability of the specific element being included in the testing image is high. The step allows the highly accurate first recognizing engine, which employs the deep convolutional neural network algorithm, to continue the recognition of the testing image. The effect of the deep convolutional neural network algorithm has been described previously, and is thus not reiterated herein.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. An image recognition method based on deep learning, including steps of:
    activating a second recognizing engine to recognize a testing image when the testing image is also recognized by a first recognizing engine; and
    determining whether to interrupt the step of recognizing the testing image by the first recognizing engine by a processing circuit according to a result outputted by the second recognizing engine after the step of recognizing the testing image by the second recognizing engine is completed;
    wherein the first recognizing engine and the second recognizing engine employ convolutional neural network algorithms, the first recognizing engine employs a deep convolutional neural network algorithm, and the second recognizing engine employs a shallow convolutional neural network algorithm.

2. The image recognition method according to claim 1, wherein the step of determining whether to interrupt the step of recognizing the testing image by the first recognizing engine further includes:
    determining if the result is greater than or equal to a threshold by the processing circuit; and
    the processing circuit sending no interrupt command to interrupt the step of recognizing the testing image by the first recognizing engine if the result is greater than or equal to the threshold.

3. An image recognition system based on deep learning, comprising:
    an image sensor for capturing a testing image;
    a first recognizing engine for recognizing the testing image;
    at least one second recognizing engine for recognizing the testing image, wherein the at least one second recognizing engine is activated to recognize the testing image when the first recognizing engine is recognizing the testing image; and
    a processing circuit for determining whether to interrupt the first recognizing engine recognizing the testing image according to a result outputted by the at least one second recognizing engine after the at least one second recognizing engine completes recognition of the testing image;
    wherein the first recognizing engine and the second recognizing engine employ convolutional neural network algorithms, the first recognizing engine employs a deep convolutional neural network algorithm, and the second recognizing engine employs a shallow convolutional neural network algorithm.

4. The image recognition system according to claim 3, wherein the processing circuit conducts the following steps to determine whether to interrupt the first recognizing engine recognizing the testing image:
    determining if the result is greater than or equal to a threshold by the processing circuit; and
    the processing circuit sending no interrupt command to interrupt the first recognizing engine recognizing the testing image if the result is greater than or equal to the threshold.

* * * * *